(12) United States Patent
Lee

(10) Patent No.: US 11,178,638 B2
(45) Date of Patent: Nov. 16, 2021

(54) ELECTRONIC DEVICE USING PLURALITY OF SUBSCRIBER IDENTIFICATION MODULES, AND METHOD FOR PROVIDING COMMUNICATION SERVICE THEREFOR

(71) Applicant: Samsung Electronics Co., Ltd., Suwon-si (KR)

(72) Inventor: Sanghyun Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/971,045

(22) PCT Filed: Feb. 22, 2019

(86) PCT No.: PCT/KR2019/002187
§ 371 (c)(1),
(2) Date: Aug. 19, 2020

(87) PCT Pub. No.: WO2019/164325
PCT Pub. Date: Aug. 29, 2019

(65) Prior Publication Data
US 2020/0396714 A1 Dec. 17, 2020

(30) Foreign Application Priority Data
Feb. 23, 2018 (KR) .................. 10-2018-0022219

(51) Int. Cl.
*H04W 88/06* (2009.01)
*H04W 68/02* (2009.01)
(Continued)

(52) U.S. Cl.
CPC .......... *H04W 68/02* (2013.01); *H04W 36/08* (2013.01); *H04W 36/30* (2013.01); *H04W 48/10* (2013.01);
(Continued)

(58) Field of Classification Search
CPC ...... H04W 68/02; H04W 36/08; H04W 88/06
See application file for complete search history.

(56) References Cited

U.S. PATENT DOCUMENTS 10,028,305 B2    7/2018 Han
10,623,946 B1 *  4/2020 Kumar .................. H04W 76/27
(Continued)

FOREIGN PATENT DOCUMENTS

KR    10-2018-0016250 A    2/2018

*Primary Examiner* — Barry W Taylor
(74) *Attorney, Agent, or Firm* — Jefferson IP Law, LLP

(57) ABSTRACT

Various embodiments of the present invention relate to an electronic device using a plurality of subscriber identification modules, and a method for providing a communication service therefor. According to various embodiments of the present invention, an electronic device comprises: a first subscriber identification module; a second subscriber identification module; a communication circuit operatively connected to the first subscriber identification module and the second subscriber identification module; and a processor operatively connected to the communication circuit, wherein the processor may monitor a paging cycle for the first subscriber identification module and the second subscriber identification module, determine whether a paging conflict has occurred in which a first paging cycle of the first subscriber identification module and a second paging cycle of the second subscriber identification module overlap for at least a certain interval, and, on the basis of whether the paging conflict has occurred, reselect a cell in response to the subscriber identification module in idle mode of the first subscriber identification module or the second subscriber identification module. Various embodiments are possible.

11 Claims, 12 Drawing Sheets

(51) Int. Cl.
*H04W 36/08* (2009.01)
*H04W 36/30* (2009.01)
*H04W 48/10* (2009.01)
*H04W 52/02* (2009.01)

(52) U.S. Cl.
CPC ... *H04W 52/0216* (2013.01); *H04W 52/0229* (2013.01)

(56) References Cited

U.S. PATENT DOCUMENTS

| | | |
|---|---|---|
| 2013/0150105 A1 | 6/2013 | Clevorn et al. |
| 2014/0106750 A1 | 4/2014 | Roullier et al. |
| 2014/0128082 A1 | 5/2014 | Chirayil |
| 2015/0141017 A1 | 5/2015 | Krishnamoorthy et al. |
| 2016/0134317 A1 | 5/2016 | Hu et al. |
| 2018/0368099 A1* | 12/2018 | Chen .................. H04W 48/18 |
| 2021/0105607 A1* | 4/2021 | Ioffe .................. H04W 8/183 |

* cited by examiner

ELECTRONIC DEVICE USING PLURALITY OF SUBSCRIBER IDENTIFICATION MODULES, AND METHOD FOR PROVIDING COMMUNICATION SERVICE THEREFOR

TECHNICAL FIELD

The disclosure relates to an electronic device using a plurality of subscriber identification modules and method of providing communication service thereof.

BACKGROUND ART

With the recent development of technology, the field of mobile communication systems continues to develop into 3G mobile communication technology (e.g., code division multiple access (CDMA), wideband code division multiple access (WCDMA)), and 4G mobile communication technology (e.g., long term evolution (LTE), long term evolution advanced (LTE-A)).

Recently, an electronic device may provide a mobile communication service to a user using a subscriber identification module (SIM) in which information of a mobile communication subscriber is stored. Generally, an electronic device uses a single SIM, but an electronic device that can use two or more SIMs has also been released.

DISCLOSURE OF INVENTION

Technical Problem

If the electronic device is not connected to a network such as a base station for a certain period of time, the electronic device can transmit and receive data to and from the network only at a configured period or when necessary. For example, according to the Institute of Electrical and Electronics Engineers (IEEE) 802.16 communication system standard, the electronic device may operate in an idle mode to minimize power consumption when there is no traffic to be transmitted/received for a predetermined time.

For example, the electronic device in the idle mode can reduce power consumption by monitoring whether a base station transmits a paging message corresponding to the SIM for a configured time, and attempts to receive the paging message according to a certain period (hereinafter referred to as a "paging interval (PI)") in which the paging cycle periodically appears.

In the case of an electronic device capable of using two or more SIMs (e.g., a dual subscriber identification module dual standby (DSDS) device), it is possible to attempt to receive a paging message corresponding to each of the two SIMs, based on a time division system (method).

However, when the paging cycles corresponding to the two SIMs overlap each other (hereinafter, referred to as 'paging conflict [collision]'), the electronic device may only attempt to receive a paging message corresponding to one SIM, and might not attempt to receive a paging message corresponding to the other SIM.

Solution to Problem

An electronic device according to various embodiments may include a first subscriber identification module, a second subscriber identification module, a communication circuitry operatively connected to the first subscriber identification module and the second subscriber identification module, and a processor operatively connected to the communication circuitry, wherein the processor is configured to: monitor paging cycles for the first subscriber identification module and the second subscriber identification module; determine whether a paging conflict has occurred in which a first paging cycle of the first subscriber identification module and a second paging cycle of the second subscriber identification module overlap for at least a certain interval; and perform cell reselection in response to the subscriber identification module of an idle state among the first subscriber identification module or the second subscriber identification module, based on whether the paging collision has occurred.

An operation method of an electronic device according to various embodiments may include: monitoring paging cycles for a first subscriber identification module and a second subscriber identification module; determining whether a paging conflict has occurred in which a first paging cycle of the first subscriber identification module and a second paging cycle of the second subscriber identification module overlap for at least a certain interval; and performing cell reselection in response to a subscriber identification module of an idle state among the first subscriber identification module or the second subscriber identification module, based on whether the paging collision has occurred.

Advantageous Effects of Invention

According to various embodiments, even when a paging collision occurs due to overlap of at least a portion of a paging cycle corresponding to a plurality of subscriber identification modules, each paging message corresponding to the plurality of subscriber identification modules can be received.

MODE FOR THE INVENTION

Figure 1:
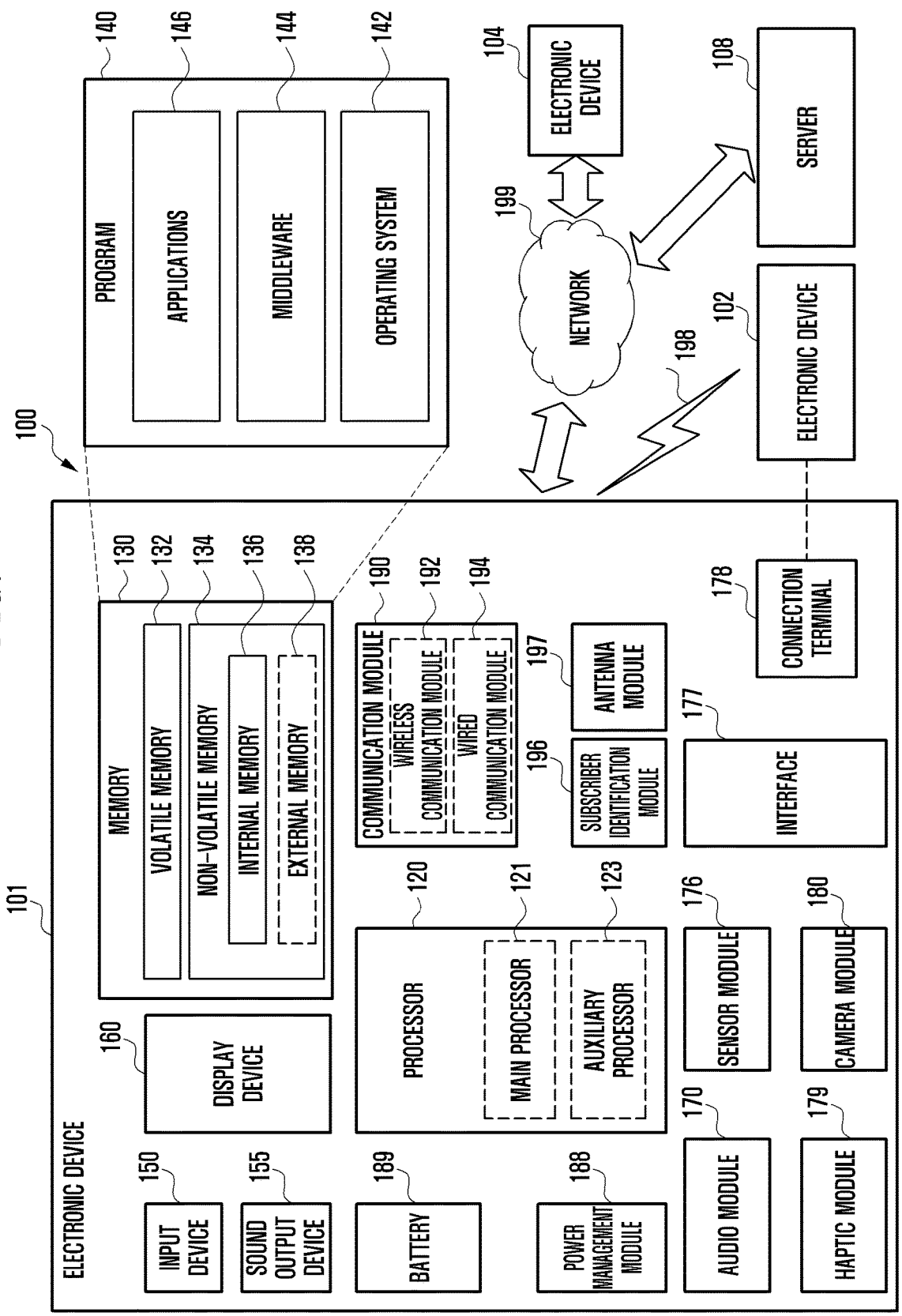
FIG. 1 is a block diagram of an electronic device in a network environment according to various embodiments.

Hereinafter, various embodiments of the disclosure will be described with reference to the accompanying drawings. It should be appreciated that the embodiments and the terms used therein are not intended to limit the technological features set forth herein to particular embodiments and include various changes, equivalents, and/or alternatives for the corresponding embodiment. With regard to the description of the drawings, similar reference numerals may be used to designate similar or relevant elements. Further, the embodiments of the disclosure have been presented to explain the technical contents of the embodiments of the disclosure and help understanding thereof, and are not intended to limit the scope of the technical features of the disclosure. Therefore, the scope of the disclosure should be construed to include all changes and modifications based on the technical idea of the disclosure.

Hereinafter, techniques described in various embodiments of the disclosure may be used in various wireless access systems such as code division multiple access (CDMA), frequency division multiple access (FDMA), time division multiple access (TDMA), orthogonal frequency division multiple access (OFDMA), single carrier frequency division multiple access (SC-FDMA), and the like. CDMA may be implemented by radio technology such as universal terrestrial radio access (UTRA) or CDMA2000. TDMA may be implemented by radio technologies such as global system for mobile communications (GSM)/general packet radio service (GPRS)/enhanced data rates for GSM evolution (EDGE). OFDMA may be implemented with wireless technologies such as IEEE 802.11 (Wi-Fi), IEEE 802.16 (WiMAX), IEEE 802-20, and evolved UTRA (E-UTRA). UTRA is a part of the universal mobile telecommunications system (UMTS). The 3rd generation partnership project (3GPP) long term evolution (LTE) adopts OFDMA in the downlink and SC-FDMA in the uplink as a part of evolved UMTS (E-UMTS) using E-UTRA. LTE-A (Advanced) is an evolved version of 3GPP LTE.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, a memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation.

According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., over wires) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., over wires) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a cellular network, the Internet, or a computer network (e.g., a LAN or a wide area network (WAN)). These various types of communication modules may be implemented as a single component (e.g., a single chip), or may be implemented as multi components (e.g., multi chips) separate from each other.

The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101.

According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device 101 according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements.

It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., over wires), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
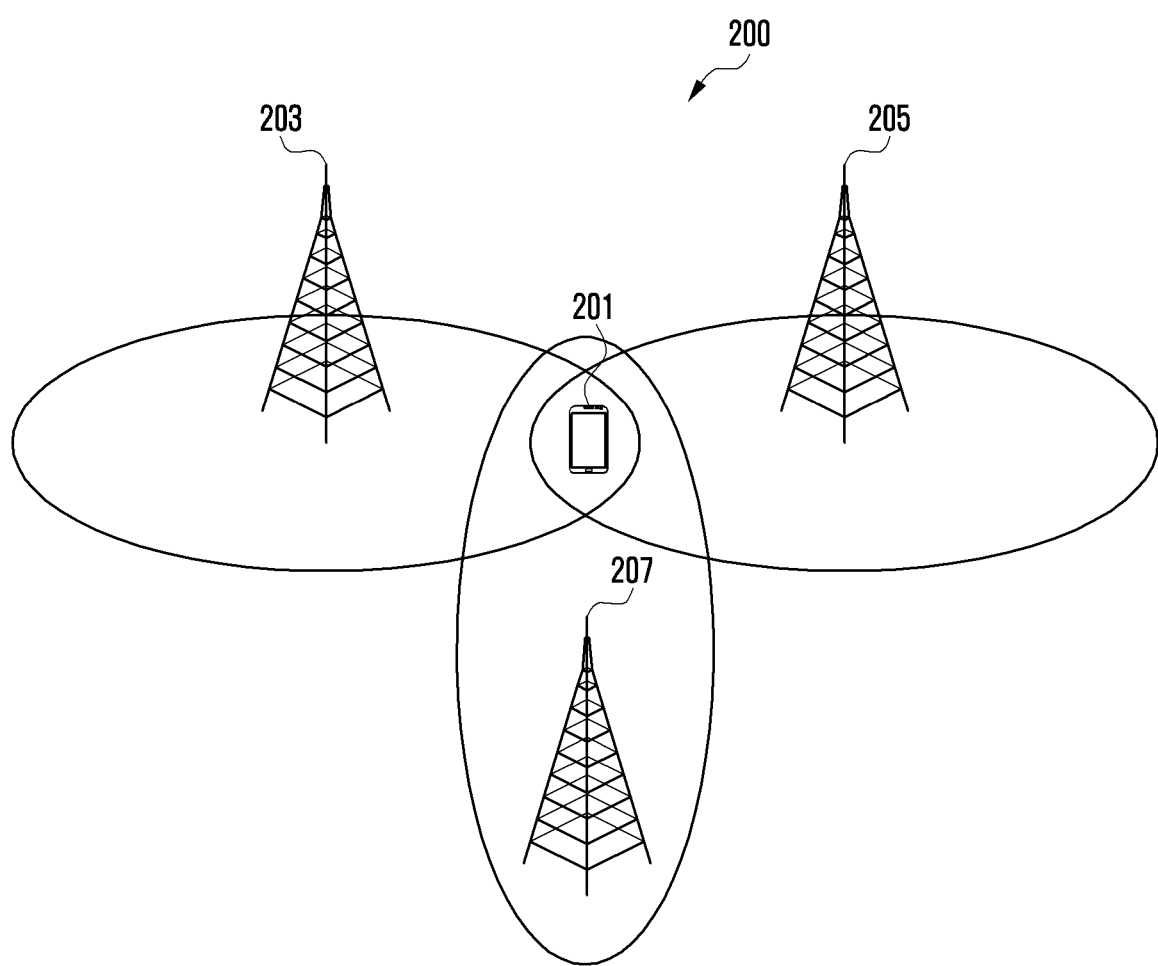
FIG. 2 is an exemplary diagram conceptually illustrating a wireless communication system according to various embodiments.

FIG. 2 is an exemplary diagram conceptually illustrating a wireless communication system 200 according to various embodiments.

Referring to FIG. 2, the wireless communication system 200 (e.g., a part of the network environment 100 of FIG. 1) according to various embodiments may include an electronic device 201 (e.g., electronic device 101 of FIG. 1), a first base station (BS) (Node B, or eNode B) 203, a second base station 205 and/or a third base station. The wireless communication system 200 may further include, for example, a base station controller ((BSC), or radio network controller (RNC)) supporting each base stations 203, 205, and 207, a mobile switching center ((MSC), serving GPRS support node (SGSN), mobility management entity (MME), or gateway) connected to the base station controller to support switching for a call function, a service center, or the like.

According to various embodiments, the electronic device 201 may include all or part of the electronic device 101 shown in FIG. 1. Hereinafter, the operation of the electronic device 201 described may be understood as, for example, an operation of a processor (e.g., the processor 120 of FIG. 1).

In an embodiment, the base stations 203, 205, and 207 may refer to an entity communicating with the electronic device 201, and a BS, a base station transceiver subsystem (BTS), a cell, and a Node B (NB), eNode B (eNB), access point (AP), or network (e.g., network 199 in FIG. 1).

In an embodiment, the electronic device 201 may mean an entity communicating with the base stations 203, 205, and 207, and may be referred to as a user equipment (UE), a subscriber station (SS), a wireless device, a mobile station (MS), a mobile equipment (ME), or a terminal.

The first base station 203, the second base station 205, and the third base station 207 may respectively form a wireless communication coverage according to the transmission power of the base station to respectively support access to the wireless communication network to the electronic device 201 located in the wireless communication coverage. In various embodiments, each base station 203, 205, 207 may have one or more cells, and operators providing services within the base stations 203, 205, 207 may be identified as public land mobile networks (PLMN). In various embodiments, a base station may be defined as one cell for convenience of description.

When the electronic device 201 is, for example, a dual subscriber identification module (SIM) device (e.g., a dual SIM dual standby (DSDS) device), the electronic device 201 may perform wireless communication services through at least one of the first base station 203, the second base station 205, or the third base station 207 according to a user request or a value configured in the electronic device 201. For example, the electronic device 201 may simultaneously access the first wireless communication network of the first base station 203 and the second wireless communication networks of the second base station 205 to simultaneously perform wireless communication services. In various embodiments, it is described that the wireless communication service is performed through the first base station 203 and the second base station 205 for convenience of description, but the disclosure is not limited thereto. For example, in various embodiments, an electronic device 201 having a first SIM and a second SIM is mainly described, but is not limited thereto, and may be applied to an electronic device 201 having three or more SIMs.

According to an embodiment of the disclosure, the electronic device 201 may perform an operation related to base station registration during power on. According to an embodiment, the electronic device 201 may perform an operation of selecting a base station (or cell) (e.g., cell selection/reselection operation) in order to receive a mobile communication service. When the power is turned on, the electronic device 201 may search for a base station located in the vicinity to obtain a mobile communication service, and select a base station having a higher priority among the searched base stations (e.g., select a base station corresponding to "SIM")

In the wireless communication system, the electronic device 201 may perform a cell selection/reselection operation for optimal wireless access quality. For example, when selecting a base station, the electronic device 201 may synchronize each cell through a synchronization channel (SCH) in order to search for a selectable or suitable cell (or base station).

The electronic device 201 may receive system information (SI) from the selected base station, for example, after selecting the base station. According to an embodiment of the disclosure, after the base station is selected, the electronic device 201 may receive system information transmitted through a broadcast control channel (BCCH). The electronic device 201 may select target cells by obtaining information necessary for base station selection (e.g., cell selection/reselection, or PLMN selection) through system information. Here, the electronic device 201 may identify, for example, control information of a random access channel (RACH), location area identification (RACH), cell ID (cell ID), and the like in the system information.

In an embodiment, the base station selection operation may be performed for various reasons. For example, when the power of the electronic device 201 is turned on, the electronic device 201 may perform a base station selection operation in order to camp-on the cell of the service provider to which the electronic device 201 has subscribed. According to an embodiment, the system information may include, for example, information used by the electronic device 201 to access the base station. For example, according to Section 5.2.2 of 3GPP TS 36.331 V8.7.0 (2009 Sep.) "Radio Resource Control (RRC); Protocol specification (Release 8)", the system information may include a master information block (MIB), a scheduling block (SB), and a system information block (SIB). The MIB may include, for example, physical configuration of the base station (e.g., information about bandwidth, etc.). The SB may include, for example, SIB transmission information (e.g., information related to a transmission period, etc.). The SIB may include, for example, a PLMN identifier of a base station, tracking area code (TAC), cell ID, and the like.

In various embodiments, the first base station 203, the second base station 205, or the third base station 207 may periodically transmit system information to the electronic device 201 located in each wireless communication coverage, and may transmit a paging message according to the request of another electronic device to the target electronic device (e.g., the electronic device 201).

According to an embodiment, the layers of the radio interface protocol between the electronic device 201 and each of the base stations 203, 205, 207 (or network) may be divided into, for example, first layers (L1, Layer1), second layers (L2, Layer2), and third layers (L3, Layer3), based on the lower three layers of the open system interconnection (OSI) model, which is well known in wireless communication systems. A physical layer (PHY) belonging to the first layer may provide an information transfer service using a physical channel, and the radio resource control (RRC) layer located in the third layer may serve to control radio resources between the electronic device 201 and the base station. To this end, the RRC layer may exchange RRC messages with each other between the electronic device 201 and the base station.

Figure 3:
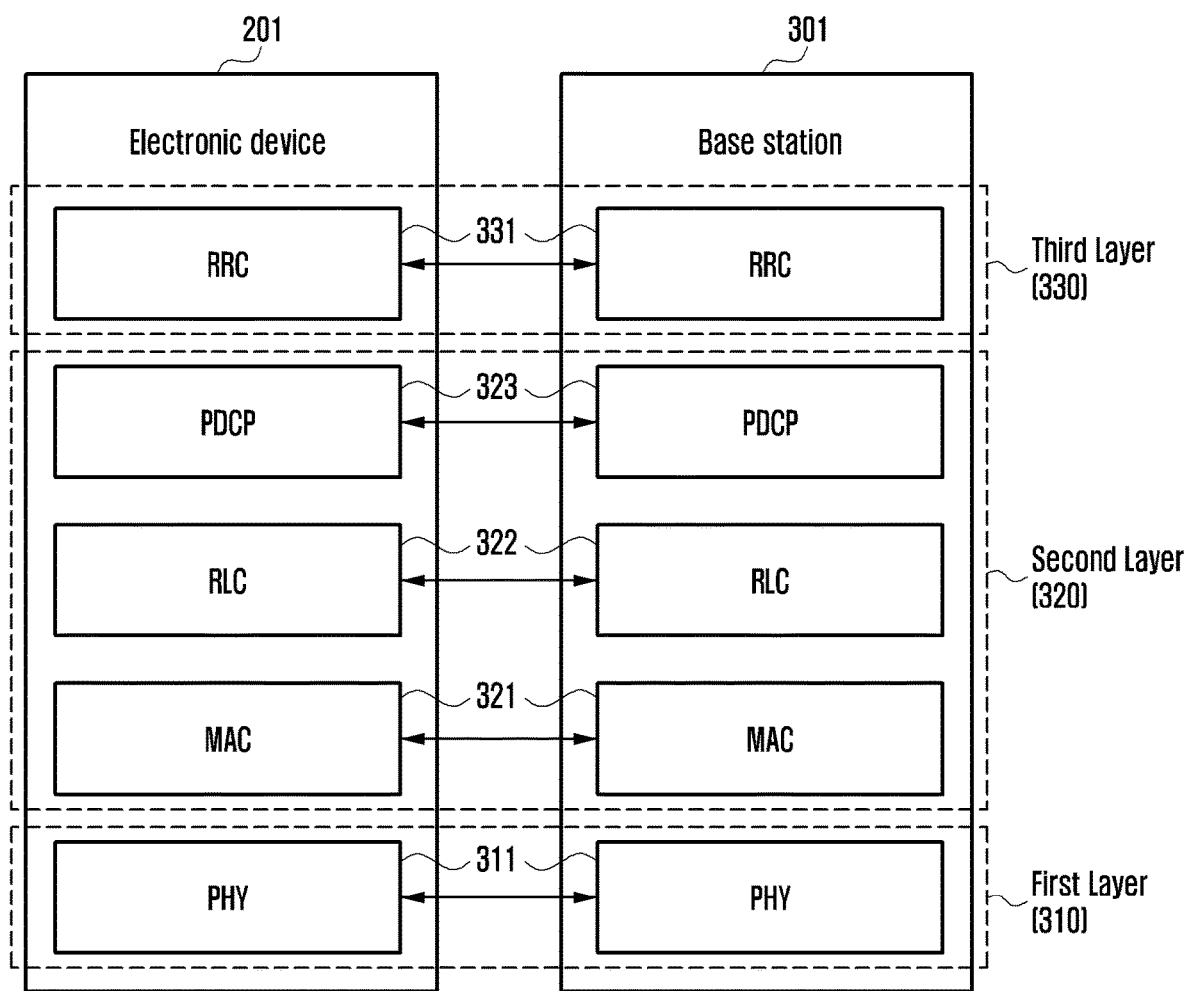
FIG. 3 is a diagram illustrating an example of a radio interface protocol structure between an electronic device and a base station according to various embodiments.

FIG. 3 is a diagram illustrating an example of a radio interface protocol structure between an electronic device 201 and a base station 301 according to various embodiments.

In FIG. 3, although not shown, the radio interface protocol structure may be divided into a radio protocol architecture for a user plane (or a data plane) and a radio protocol architecture for a control plane. The user plane represents a protocol stack for transmitting user data (e.g., voice data or Internet packet data), and the control plane may represent a protocol stack for transmission of control signals (e.g., control messages used to manage calls).

Referring to FIG. 3, the first layer 310 may include a PHY layer 311. The PHY layer 311 provides an information transfer service to an upper layer using a physical channel. The PHY layer 311 may be connected to an upper medium access control (MAC) layer 321 through a transport channel, and data may be moved between the MAC layer 321 and the PHY layer 311 through the transport channel. In addition, data may be moved between different PHY layers, for example, between a PHY layer of a transmitting side and a receiving side through a physical channel. For example, the PHY layer 311 may physically send protocol data units (MAC-PDUs) received from the MAC layer to the base station (e.g., eNode B), or physically receive data from the base station.

The second layer 320 may include a MAC layer 321, a radio link control (RLC) layer 322, and a packet data convergence protocol (PDCP) layer 323. The MAC layer 321 provides a service to the RLC layer 322 which is a higher layer through a logical channel. For example, the MAC layer 321 may guarantee data scheduling (e.g., priority processing between electronic devices by dynamic scheduling, priority processing between logical channels of the electronic device, logical channel prioritization, etc.) and data reliability (e.g., data error correction). The RLC layer 322 includes three operation modes of transparent mode (TM), unacknowledged mode (UM), and acknowledgment mode (AM), and may be a layer for ensuring data reliability. For example, the electronic device 201 may correct reliability through retransmission when the base station 301 does not receive a packet or receives an error packet (e.g., a PDU transmission failure). The PDCP layer 323 is responsible for header compression and decompression to reduce unnecessary control information to efficiently transmit packets (e.g., IP data), data transmission (e.g., user plane or control plane), encryption and decryption of user plane data and control plane data, integrity protection and integrity verification of duplicate data of control plane data.

The third layer 330 may include an RRC layer 331. The RRC layer 331 may be defined only in the control plane. The RRC layer 331 may be a layer used for the electronic device 201 to access and maintain the base station 301 (e.g., network, cell). For example, handover may be processed through the RRC layer 331, which should be processed when the electronic device 201 moves. When the electronic device 201 is in an idle mode, the handover may be processed at a non-access stratum (NAS) layer (not shown) instead of the RRC layer 331. The RRC layer 331 may be used to verify whether the electronic device 201 is normally connected and maintained to the base station 301. In an embodiment, the NAS layer (not shown) may perform functions such as session management and mobility management.

Hereinafter, an RRC state of the electronic device 201 and an RRC connection method will be described. In an embodiment, the RRC state indicates whether the RRC of the electronic device 201 has a logical connection with the RRC of the base station, and if connected, it may be referred to as a RRC connection state (RRC_CONNECTED), and if not connected, it may be referred to as RRC idle state (RRC_IDLE). According to an embodiment, handover may represent a technique for managing the mobility of the electronic device 201 in a connected state (e.g., RRC-CONNECTED), and cell reselection may represent a technique for managing the mobility of the electronic device 201 in an idle state (e.g., RRC-IDLE). While the cell to which the electronic device 201 handovers is determined by the base station during handover, which cell to select when the electronic device 201 reselects the cell may be determined by the electronic device 201. For example, when the cell is reselected, the electronic device 201 may determine which cell to camp-on (e.g., a state in which, after the electronic device 201 finishes the cell reselection operation, the system information and the paging information are monitored in the newly selected cell) or stay.

According to an embodiment, the base station may identify the electronic device 201 in the RRC connection state in a cell unit. On the other hand, the base station cannot identify the RRC idle electronic device 201 on a cell-by-cell basis and can manage it in a unit of tracking area (TA), which is a larger area unit than the cell. For example, in order for the electronic device 201 in the RRC idle state to receive a service such as voice or data from a cell, the electronic device 201 should transit the state to the RRC connected state.

According to an embodiment of the disclosure, when the electronic device 201 is powered on by the user, first, an appropriate cell may be searched (e.g., a cell selection operation) and then may be in an RRC idle state in the corresponding cell. When it is necessary to establish an RRC connection in the RRC idle state, the electronic device 201 may transit to the RRC connection state by performing an RRC and RRC connection establishment operation of the base station. In an embodiment, the case in which an RRC connection is established may include, for example, a case in which uplink data transmission is required due to a user's call attempt, a paging message is received from a base station and a response message needs to be transmitted.

According to an embodiment, the base station might not have the context of the electronic device 201 when the electronic device 201 is in an idle state. Accordingly, the electronic device 201 may perform mobility-related operations, based on the electronic device 201, such as a cell selection or cell reselection operation, without receiving a command from a base station when the electronic device 201 is in an idle state. According to an embodiment, the electronic device 201 in an idle state may periodically wake-up to identify whether there is a paging message for the electronic device 201. While camping-on a cell, the electronic device 201 may receive system information broadcast by a base station, periodically measure a signal of a serving cell, and when cell reselection is triggered, measure the signals of neighboring cells to perform an operation such as reselection of the serving cell.

Hereinafter, an example of operation of the electronic device 201 according to various embodiments will be described with reference to FIGS. 4, 5, and 6.

Figure 4:
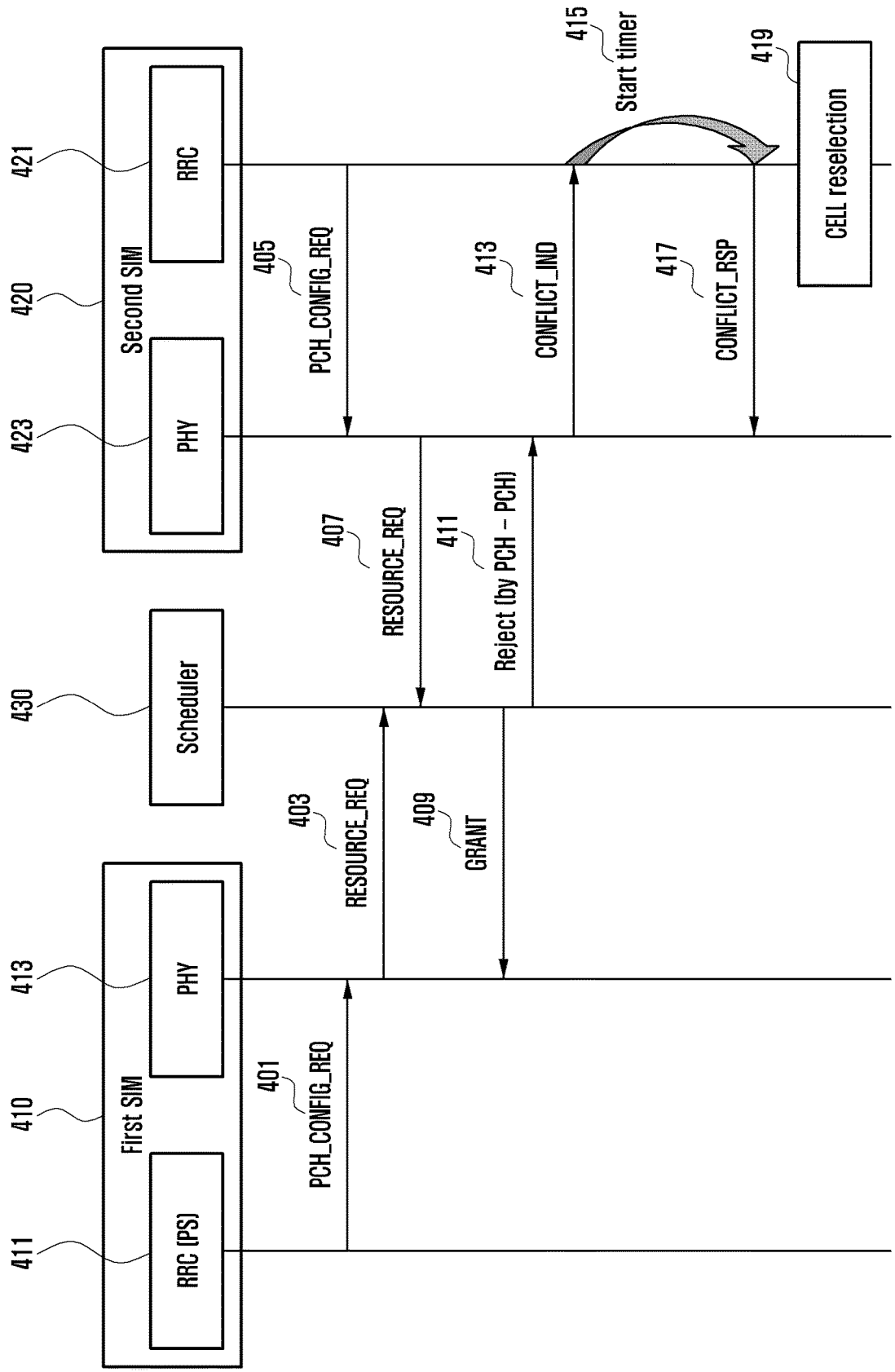
FIG. 4 is a diagram illustrating an operation of providing a communication service according to various embodiments.

FIG. 4 is a diagram illustrating an operation of providing a communication service of an electronic device 201 according to various embodiments. FIG. 5 and FIG. 6 are diagram illustrating examples of a paging cycle (or paging location) (e.g., time to read (identify) paging) corresponding to a plurality of subscriber identification modules (e.g., first SIM 410, second SIM 420) according to various embodiments.

In an embodiment, the operation according to FIG. 4 may be an operation performed by a processor (e.g., the processor 120 of FIG. 1) of the electronic device 201, and may be an example in which the electronic device 201 includes two subscriber identification modules (e.g., first SIM 410 and second SIM 420).

As shown in FIG. 4, FIG. 4 illustrates a scheduler, a radio interface protocol corresponding to the first SIM 410 (e.g., RRC layer 411, PHY layer 413), and a portion of a radio interface protocol (e.g., RRC layer 421, PHY layer 423) corresponding to the second SIM 420 is illustrated.

In various embodiments, the electronic device 201, for example, may be in a state of monitoring system information and paging (or paging information) while operating in an idle mode without data transmission/reception through the first SIM 410 and the second SIM 420. For example, the electronic device 201 may be in a state of currently in an idle state and camping-on a first base station 203 corresponding to the first SIM 410 and a second base station 205 corresponding to the second SIM 420.

According to an embodiment, the electronic device 201 may receive system information from a base station (e.g., the first base station 203 of FIG. 2 and the second base station 205 of FIG. 2) in an idle mode. According to an embodiment, in FIG. 4, the first paging service may be requested (e.g., receiving a first paging message) from the first base station 203 in which the electronic device 201 camps-on by the first SIM 410 in the idle mode, and then a second paging service may be requested (e.g., receiving a second paging message) from the second base station 205 in which the electronic device 201 camps-on by the second SIM 420. In an embodiment, for convenience of description, the first base station 203 and the second base station 205 are described, but are not limited thereto. For example, it can also be understood that the electronic device 201 operates on a cell basis based on different cells (e.g., first cell, second cell) included in one or each base station through the first SIM 410 and the second SIM 420.

Referring to FIG. 4, in operation 401, according to an embodiment, when the paging (or packet service request) is generated from the currently camped-on base station (e.g., the first base station 203), the electronic device 201 may transmit a request (e.g., PCH_CONFIG_REQ) for forming a paging channel (PCH) for transmitting a paging message to the PHY layer 413 through the RRC layer 411 to the PHY layer 413.

According to one embodiment, in operation 403, the PHY layer 413 may transmit a resource allocation request (e.g., RESOURCE_REQ) to the scheduler 430 in response to the PCH_CONFIG_REQ.

According to an embodiment, when paging occurs based on the first SIM 410, as in operation 405 (e.g., PCH_CONFIG_REQ for the second paging message) and operation 407 (e.g., RESOURCE_REQ for the second paging message), paging may also occur based on the second SIM 420. For example, a paging time point may overlap in the first SIM 410 and the second SIM 420. As described above, when the paging timings of the first SIM 410 and the second SIM 420 overlap, it is not possible to receive one paging and the probability of paging reception may decrease. This will be described with reference to FIG. 5.

Figure 5:
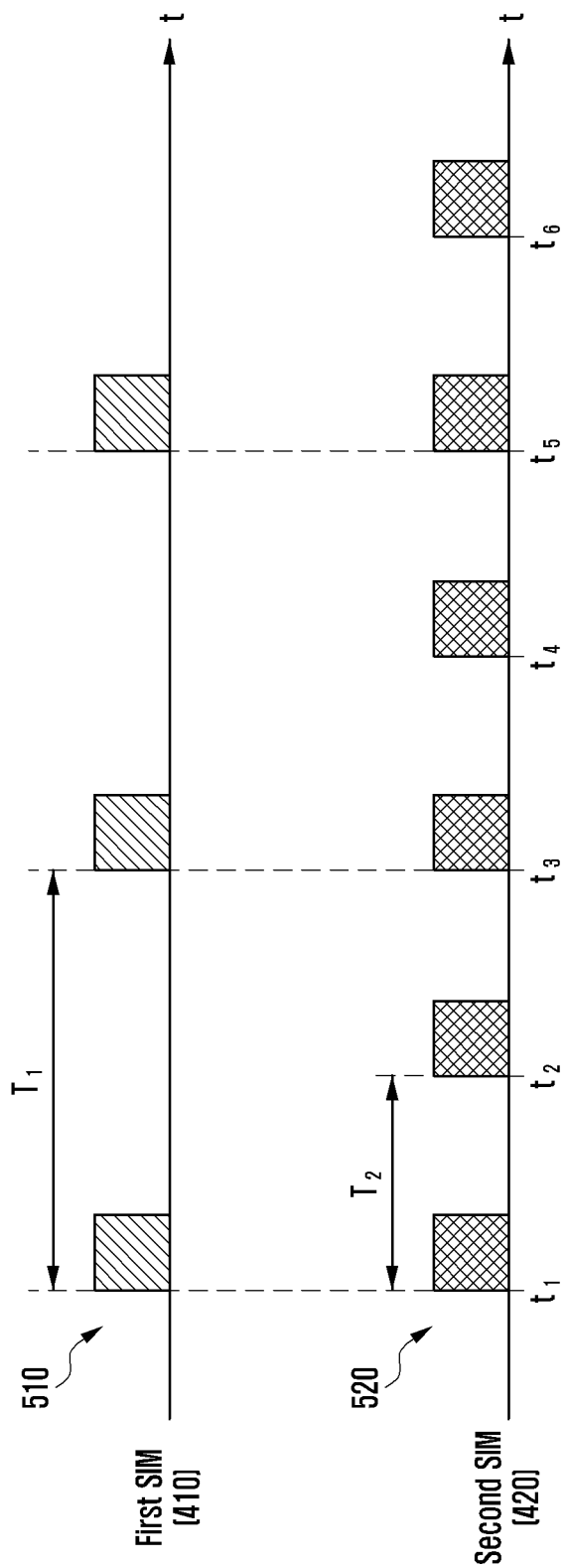
FIG. 5 is a diagram illustrating an example of a paging cycle corresponding to a plurality of subscriber identification modules according to various embodiments.

Referring to FIG. 5, according to an embodiment, in relation to the first SIM 410, the electronic device 201 may wake up to identify (or monitor) whether there is a paging message related to the first SIM 410 at a first paging cycle 510 (e.g., time to read (or identify) paging) of the first SIM 410, for example, every paging discontinuous reception (DRX) cycle (e.g., t1, t3, and t5 time points). According to an embodiment, in relation to the second SIM 420, the electronic device 201 may wake up to identify whether there is a paging message related to the second SIM 420 at a second paging cycle 520 (e.g., time points from t1 to t5) of the first SIM 410. In this case, at least a portion of the time to identify the paging associated with the first SIM 410 in the first paging cycle 510 and the time to identify the paging associated with the second SIM 420 in the second paging cycle 520 may overlap at least partially and a paging conflict may occur.

Figure 6:
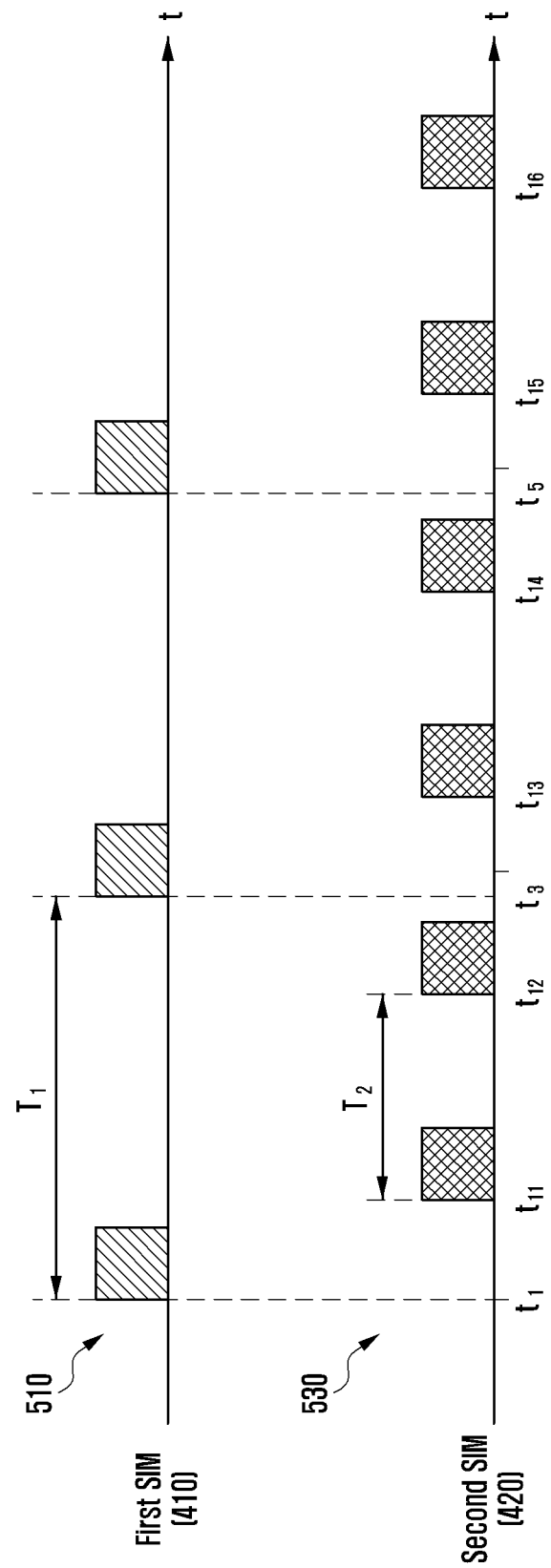
FIG. 6 is a diagram illustrating an example of a paging cycle corresponding to a plurality of subscriber identification modules according to various embodiments.

According to an embodiment, in FIG. 5 and FIG. 6, a time interval T1 between paging points of the first paging cycle 510 may be configured longer than a time interval T2 between paging points of the second paging cycle 520. For example, it may represent that the paging time of the second paging cycle 520 occurs more frequently than the paging time of the first paging cycle 510.

Generally, for example, when a paging collision occurs (e.g., t1, t3, t5 time points), the electronic device 201 may perform a paging-related operation (e.g., receiving a paging message related to the first SIM 410) (e.g., grant), based on a paging (or a wake-up SIM (e.g., the first SIM 410)) that is generated first, and may prevent (e.g., reject) a paging-related operation (e.g., receiving a paging message related to the second SIM 420) for paging generated later (or wake-up SIM (e.g., second SIM 420)). Accordingly, in the related art, paging related to the second SIM 420 might not be received. For example, when the paging timings of the first SIM 410 and the second SIM 420 overlap, a paging reception probability associated with any one SIM may decrease.

Referring back to FIG. 4, the scheduler 430 may determine paging-related operations of the first SIM 410 and the second SIM 420 according to the scheduling according to the paging cycle of the first SIM 410 and the second SIM 420. According to an embodiment, the scheduler 430 may determine to perform a paging-related operation on the first SIM 410 and not to perform a paging-related operation on the second SIM 420. Accordingly, the scheduler 430, in operation 409, may transmit an acknowledgment response (e.g., GRANT) to the PHY layer 413 of the first SIM 410, and transmit a rejection response (e.g., REJECT) to the PHY layer 423 of the second SIM 420 in operation 411. According to an embodiment, the scheduler 430 may include a reject cause (e.g., paging collision information) or separately provided when transmitting a rejection response to the PHY layer. According to an embodiment, the rejection response may be transmitted to the PHY layer by PCH.

According to an embodiment, the PHY layer 413 to which an acknowledgment response (e.g., GRANT) has been delivered may perform paging-related operations through the RRC layer 411. For example, in connection with the first SIM 410, the electronic device 201 may transit from an RRC idle state to an RRC connected state in order to receive packet services such as voice or data from a base station (e.g., a camped-on cell).

According to an embodiment, in operation 413, the PHY layer 423 to which the rejection response (e.g., REJECT) is transmitted may transmit collision information (e.g., COMPLICT_IND) to the RRC layer 421 in response to the rejection response of the scheduler 430.

According to an embodiment, in operation 415, the RRC layer 421 may execute a timer (e.g., timer start) in response to collision information (e.g., COMPLICT_IND) of the PHY layer 423. According to an embodiment, the RRC layer 421 may count a certain time related to cell reselection.

According to an embodiment, the RRC layer 421 transmits a collision response (e.g., COMPLICT_RSP) to the PHY layer 423 in operation 417 in response to a timer expired (e.g., timeout), and may initiate an operation related to cell reselection (cell reselection triggering) in operation 419. In various embodiments, the electronic device 201 may perform a cell reselection operation related to the second SIM 520, based on system information broadcast by the base station.

In various embodiments, when a paging collision occurs in the first SIM 410 and the second SIM 420, in relation to the second SIM 420 where paging is rejected (or RRC idle), a cell reselection operation may be performed to select a cell in which collision does not occur. Through this, in various embodiments, paging collision between the first SIM 410 and the second SIM 420 may be avoided, thereby increasing the paging reception rate of the electronic device 201. An example of this is shown in FIG. 6. A cell reselection operation according to various embodiments will be described with reference to the drawings described below.

According to an embodiment, after completing the cell reselection operation, the electronic device 201 may receive system information and paging information from the newly selected cell, and a paging cycle (e.g., a third paging cycle 530) associated with the newly selected cell may be configured, based on the received paging information. For example, referring to FIG. 6, with respect to the second SIM 420, the second paging cycle 520 of FIG. 5 may be changed to a third paging cycle 530 associated with a newly selected cell (e.g., camped-on cell) by cell reselection. According to an embodiment, the first paging cycle 510 may include, for example, t1, t3, and t5 time points, and the third paging cycle 530 may include time points that do not overlap with the first paging cycle 510, for example, t11 to t16. As such, in the first paging cycle 510, since a paging segment for paging monitoring related to the first SIM 410 and a paging segment for paging monitoring related to the second SIM 420 in the third paging cycle 530 do not overlap, paging collisions may not occur.

Figure 7:
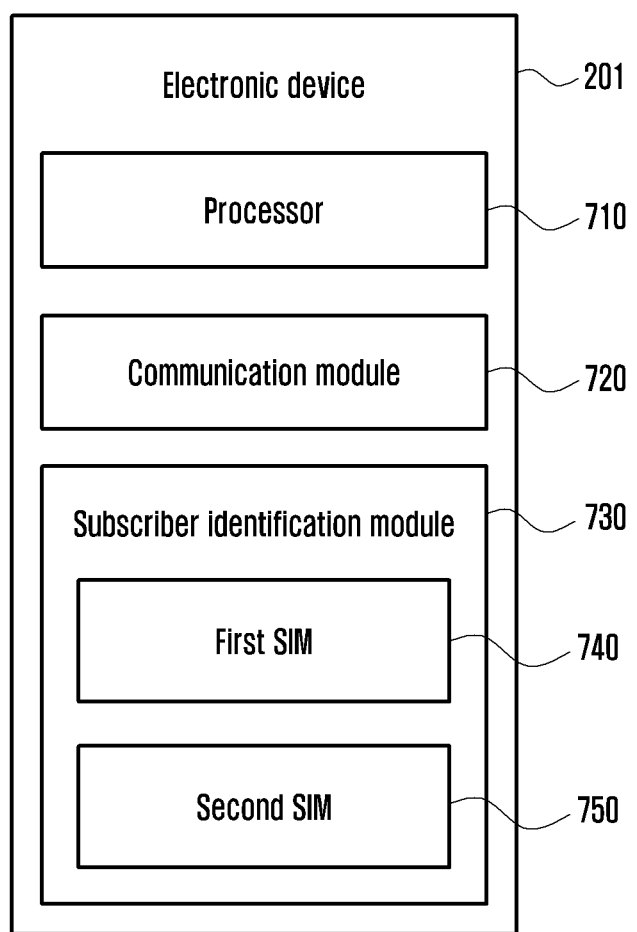
FIG. 7 is a block diagram of a configuration of an electronic device using a plurality of subscriber identification modules according to various embodiments.

FIG. 7 is a block diagram of a configuration of an electronic device 201 using a plurality of subscriber identification modules according to various embodiments.

Referring to FIG. 7, the electronic device 201 may include a processor 710 (e.g., the processor 120 of FIG. 1), a communication module 720 (e.g., a communicator including a circuit (or a communication circuitry (e.g., communication module 190 of FIG. 1)) and/or a subscriber identification module 730 (e.g., subscriber identification module 196 of FIG. 1).

According to an embodiment, the subscriber identification module 730 may include two or more SIMs, a universal SIM (USIM), or an embedded SIM (eSIM). According to an embodiment, the subscriber identification module 730 may include unique identification information (e.g., integrated circuit card identifier (ICCID)) or subscriber information (e.g., international mobile subscriber identity (IMSI)). In various embodiments, a plurality of subscriber identification modules are described as two SIMs (e.g., the first SIM 740 and the second SIM 750) for convenience of description, but the disclosure is not limited thereto. The device 201 may operate at least three or more subscriber identification modules.

According to an embodiment, the processor 710 may receive various signals (e.g., system information, paging information, paging message, etc.) from a base station (e.g., a network, cell) through the communication module 720.

According to an embodiment of the disclosure, when the electronic device 201 is powered on, the processor 710 may search for an appropriate base station (e.g., a high-priority base station) among neighboring base stations (e.g., a network or a cell) to acquire a communication service, camp-on (or access) the discovered base station, and then exist in an idle state (e.g., RRC_IDLE) in the corresponding base station. For example, the processor 710 may operate in an idle mode without data transmission and reception with a base station corresponding to the first SIM 740 and the second SIM 750, respectively.

According to an embodiment, the processor 710 may receive system information broadcast by the base station while camping-on the base station. For example, the processor 710 may receive system information broadcast by a base station (e.g., a base station camped on the basis of the first SIM 740, a base station camped on the basis of the second SIM 750) through the communication module 720 in the idle mode. In various embodiments, the system information is information broadcast by the base station, and may be composed of, for example, MIB and SIB (e.g., SIB 1 to SIB 16). In various embodiments, the processor 710 may perform a cell reselection operation, based on system information broadcast by the base station.

According to various embodiments of the disclosure, the processor 710 may monitor paging while operating in an idle mode without data transmission and reception through the first SIM 740 and the second SIM 750. Hereinafter, paging may be first identified by the first SIM 740, based on at least the monitoring result, and then paging may be identified by the second SIM 750.

According to one embodiment, the processor 710 may identify (monitor) whether there is a paging attempt related to the first SIM (740) in the paging cycle associated with the first SIM 740 (or the paging time position to check paging) (e.g., the DRX cycle) (hereinafter referred to as a "first paging cycle"). According to an embodiment, the processor 710 may identify (monitor) whether there is a paging attempt related to the second SIM 750 in the paging cycle associated with the second SIM 750 (hereinafter, referred to as a "second paging cycle").

According to various embodiments, the processor 710 may determine whether a paging conflict in which a first paging cycle related to the first SIM 740 overlaps with a second paging cycle related to the second SIM 750 occurs, when monitoring paging related to each of the first SIM 740 and the second SIM 750. According to an embodiment, the processor 710 may compare a first paging cycle related to the first SIM 740 and a second paging cycle related to the second SIM 750 having no data transmission/reception (e.g., in an idle state), and determine whether there is a paging collision between the first paging cycle and the second paging cycle, based at least on the result of the comparison, while transmitting and receiving data (e.g., paging processing, packet processing), based on the first SIM 740.

According to various embodiments, if it is determined that a paging collision occurs between the first SIM 740 and the second SIM 750, the processor 710 may perform a cell reselection operation, based on the second SIM 750 having no data transmission/reception. According to an embodiment, the processor 710 may select a new serving cell among neighboring cells of a serving cell that is currently camping on, based on the second SIM 750 to perform a cell reselection operation for camping on.

In various embodiments, the processor 710 may perform a cell reselection operation, based on the cell using the same frequency as the serving cell currently camping on, based on the second SIM 750, using a different frequency, or using another radio access technology (RAT). In various embodiments, in the cell reselection operation, the electronic device 201 in an idle state may wake up every paging cycle (e.g., a DRX cycle) to measure a signal of a serving cell, determine a reception level of the serving cell, and determine whether to select another cell, based on the reception level of the serving cell. In various embodiments, it is possible to avoid the paging collision between the plurality of subscriber identification modules by determining whether there is a paging collision between a plurality of subscriber identification modules, and selecting another cell in one subscriber identification module (e.g., an idle SIM) (e.g., performing a cell reselection operation), when a paging conflict occurs, or may occur later.

According to one embodiment, for the second SIM 750, when cell reselection for selecting another cell is triggered (e.g., triggering detection (or detection) for cell reselection) due to paging collision (or paging collision prediction), the processor 710 may perform a cell reselection operation, based on system information.

According to one embodiment, the processor 710 may measure the signal strength (e.g., RSRP, reference signal received power) value of neighbor cells, based on system information (e.g., system information related to cell reselection, for example, SIB 3 and SIB 4), determine a rank for each cell based on the measured value of the neighbor cell, and select an optimal cell (e.g., a cell having the highest priority) as a new serving cell, based on the determination result. Thereafter, the processor 710 may perform an operation to camp on the selected new cell of the second SIM 750.

According to various embodiments, quality may be increased in selecting a new serving cell through an additional determination operation in a cell reselection operation.

According to an embodiment of the disclosure, when a paging collision occurs, the processor 710 may determine whether there is a change in the serving cell for a time configured (e.g., a predetermined time) from a paging collision or at least one of the first SIM 740 or the second SIM 750. For example, the processor 710 may identify whether there is a change in the serving cell of the first SIM 740 or the serving cell of the second SIM 750 for a predetermined time after the paging collision occurs. According to an embodiment, the variation of the serving cell may be caused by cell reselection (e.g., general cell reselection operation) according to a decrease in the reception level of the serving cell when moving away from the current serving cell, for example, due to movement of the electronic device 201.

According to an embodiment, the processor 710 may identify whether there is a change in the serving cell of the first SIM 740 or the serving cell of the second SIM 750 for a predetermined time after the paging collision occurs. According to an embodiment, when the location of the electronic device 201 changes (e.g., when moving away from the current serving cell) as the user using the electronic device 201 moves, the serving cell may be changed by cell reselection (e.g., normal cell reselection) according to a decrease in the reception level of the serving cell. According to an embodiment, the processor 710 may determine whether the serving cell changes based on the cell ID of the base station corresponding to the first SIM 740 or the second SIM 750.

According to an embodiment, if it is determined that there is a change in the serving cells of the first SIM 740 or the second SIM 750 for a predetermined period of time, the processor 710 may perform an initial operation (e.g., an operation for determining whether a paging collision is occurring) again. For example, when there is a change in the serving cell, the paging cycles of the first SIM 740 and the second SIM 750 might not overlap. Accordingly, the processor 710 may switch back to an initial stage and identify again whether there is a paging collision between the serving cell of the first SIM 740 and the serving cell of the second SIM 750.

According to an embodiment, if it is determined that there is no change in the serving cells of the first SIM 740 and the second SIM 750 for a certain period of time (e.g., the electronic device 201 is stopped), the processor 710 determine a SIM (e.g., the second SIM 750) having no data transmission/reception (e.g., an idle state), and perform cell reselection operations of various embodiments in the corresponding SIM.

According to various embodiments, the processor 710 may manage a list (e.g., a cell list or a cell bar list) of SIMs (e.g., the second SIM 750 in an idle state) for which data service is not possible, for each serving cell of a SIM capable of data service (e.g., the first SIM 740). For example, the processor 710 may manage the cell ID of a serving cell in which a paging collision has occurred with a serving cell of the first SIM 740 among serving cells previously and currently camped-on by the second SIM 750 as a list in association with (or mapping) to the serving cell of the first SIM (740). Through this, in various embodiments, a ping-pong phenomenon can be prevented. For example, in a case in which paging collision between a serving cell (e.g., Cell A) of the first SIM 740 capable of data service and a serving cell (e.g., Cell B) of the second SIM 750 in which data service is not possible (e.g., in an idle state) is possible, in a situation where the first SIM 740 camps-on Cell A, the second SIM 750 might not camp-on Cell B. For example, the processor 710 may allow Cell B to be excluded from the target cell in the cell reselection operation of the second SIM 750.

According to various embodiments, the processor 710 may further consider signal quality (e.g., RSRQ, reference signal received quality) as well as signal strength (e.g., RSRP), in selecting the target cell for the serving cell during the cell reselection operation of the idle second SIM 750. According to an embodiment, upon cell reselection the processor 710 may select a cell that satisfies a reference (e.g., a reference level) in which a cell reception level (e.g., signal strength) is configured as a target cell (e.g., a candidate cell for a serving cell). For example, the reference level may include a signal measurement value for normally exchanging a signal (or message) between the electronic device 201 and a cell. According to an embodiment, if cell reselection is performed with a weak electric field cell when cell reselection, paging reception rate may decrease. Accordingly, according to various embodiments, an electric field condition may be configured as a target cell condition by considering at least a value higher than a value specified in the 3GPP standard specification. According to an embodiment, if a cell corresponding to a target cell condition is not found, the processor 310 may perform cell reselection based on a cell having a higher priority in a managed list (e.g., a cell list). For example, the processor 710 may identify the signal strength of a cell corresponding to each cell ID included in the list, and perform the second SIM 750 cell reselection, based on the cell having the strongest signal strength.

The electronic device 201 according to various embodiments may include a first subscriber identification module (e.g., first SIM 740), a second subscriber identification module (e.g., second SIM 750), communication circuits 190 and 720 operatively connected to the first subscriber identification module and the second subscriber identification module, and processors 120 and 710 operatively connected to the communication circuits 190 and 720, wherein the processors 120 and 710 may monitor the paging cycle for the first subscriber identification module and the second subscriber identification module, determine whether a paging conflict in which at least some sections overlap in a first paging cycle of the first subscriber identification module and a second paging cycle of the second subscriber identification module, and perform cell reselection in response to the idle subscriber identification module among the first subscriber identification module or the second subscriber identification module, based on whether the paging collision occurs.

According to various embodiments, the first subscriber identification module is in a radio resource control (RRC) connection state, the second subscriber identification module is in an RRC idle state, and the idle state is configured to include a state without data transmission/reception, based on the subscriber identification module.

According to various embodiments, the electronic device may receive system information (SI) from a base station corresponding to the subscriber identification module, using the communication circuitry.

According to various embodiments, the processor may identify the paging cycles corresponding to the first subscriber identification module and the second subscriber identification module, based at least on the system information.

According to various embodiments, the processor may determine any one subscriber identification module to perform cell reselection, when the processor determines that the paging collision has occurred.

According to various embodiments, the processor may determine whether the serving cell is changed in at least one of the first subscriber identification module and the second subscriber identification module for a certain interval, when the processor determines that the paging collision has occurred.

According to various embodiments, the processor may perform cell reselection for the second subscriber identification module in an idle state, based on no change in the serving cell of the first subscriber identification module and the serving cell of the second subscriber identification module for the certain interval.

According to various embodiments, the processor may map the serving cell of the first subscriber identification module and a serving cell of the second subscriber identification module to manage as a list, when the processor determines that the paging collision has occurred.

According to various embodiments, the processor may determine a target cell that satisfies a configuration condition in the neighboring cell corresponding to the second subscriber identification module, and determine a serving cell for cell reselection of the second subscriber identification module, based on the target cell.

According to various embodiments, the processor may determine a serving cell for cell reselection of the second subscriber identification module by referring to the list, when the target cell satisfying the configuration condition does not exist.

Hereinafter, a method of providing communication service of the electronic device 201 using a plurality of subscriber identification modules according to various embodiments will be described. Hereinafter, in describing an operation method of the electronic device 201, a detailed description of the contents overlapping with those described in the description with reference to the above-described drawings (e.g., FIG. 7) will be omitted. Hereinafter, the operation of the electronic device 201 may be an operation performed (or processed) by a processor of the electronic device 201 (for example, the processor 120 of FIG. 1 or the processor 710 of FIG. 7) (hereinafter referred to as a "processor 710").

Figure 8:
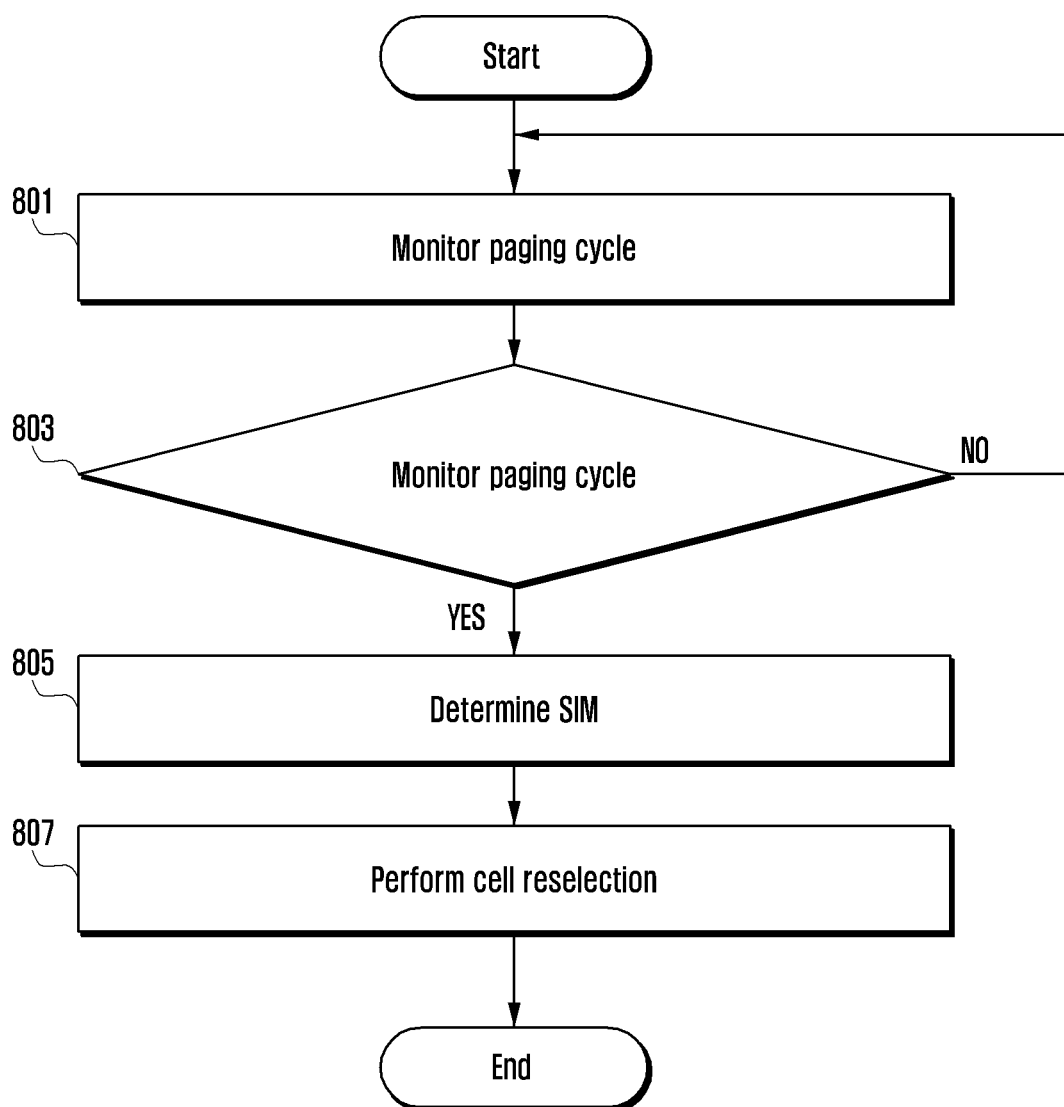
FIG. 8 is a flowchart illustrating a method for providing communication service of an electronic device according to various embodiments.

FIG. 8 is a flowchart illustrating a method for providing communication service of an electronic device 201 according to various embodiments;

Referring to FIG. 8, in operation 801, the processor 710 of the electronic device 201 may monitor a paging cycle. According to an embodiment, the processor 710 may monitor each paging cycle corresponding to a plurality of subscriber identification modules (e.g., the first SIM 740 and the second SIM 750). According to an embodiment, the processor 710 may identify a first paging cycle associated with the first SIM 740 and a second paging cycle associated with the second SIM 750. In various embodiments, after the first SIM 740 and the second SIM 750 are camped-on each serving cell, both the first SIM 740 and the second SIM 750 operate in an idle mode without data transmission or reception, or any one SIM of the first SIM 740 or the second SIM 750 may be in an active state for transmitting and receiving data.

In operation 803, the processor 710 may determine whether a paging collision occurs, based at least on the monitoring result of the paging cycle. According to an embodiment, the processor 710 may determine whether a paging collision occurs in which the first paging cycle associated with the first SIM 740 overlaps the second paging cycle associated with the second SIM 750. For example, the processor 710 may determine whether a time point when the first SIM 740 wakes up according to the first paging cycle to identify whether there is a paging attempt, and a time point when the second SIM 750 wakes up according to the second paging cycle to identify whether there is a paging attempt overlap, and determine whether a paging collision occurs, based on the result.

In operation 803, if it is determined that there is no paging collision (NO in operation 803), the processor 710 may proceed to operation 801 and perform operations subsequent to operation 801.

In operation 803, the processor 710 may determine the SIM in operation 805 if it determines a paging collision (YES in operation 803). According to an embodiment, the processor 710 may determine a SIM to perform cell reselection to avoid paging collision. According to an embodiment of the disclosure, the processor 710 may determine an idle SIM without data transmission and reception. According to an embodiment, the user may determine one SIM to use a data service among the first SIM 740 and the second SIM 750 through a user interface (UI). For example, when the user configures the use of the data service through the first SIM 740, in the case of the second SIM 750, the data service itself may be deactivated. According to various embodiments, when a paging collision occurs between the first SIM 740 and the second SIM 750, a cell reselection operation may be performed based on a SIM (for example, the second SIM 750) in which data transmission and reception is not configured. For example, in various embodiments, a cell reselection operation may be performed in a SIM without data transmission and reception (e.g., an idle state) and a SIM in which data transmission and reception is not configured by the user.

In operation 807, the processor 710 may perform a cell reselection operation. According to an embodiment, the processor 710 may determine whether there is a change in the serving cell in at least one of the first SIM 740 or the second SIM 750 for a configured time (e.g., timer expiration) from the time when the paging collision is determined. When the serving cell is not changed, the processor 710 may perform cell reselection for the second SIM 750 in an idle state. According to an embodiment, through the cell reselection of the second SIM 750, the second SIM 750 may be changed to a paging cycle related to a new serving cell (e.g., a third paging cycle that does not overlap with the first paging cycle), the paging collision according to the first paging cycle of the first SIM 740 and the third paging cycle of the changed second SIM 750 can be prevented.

Figure 9:
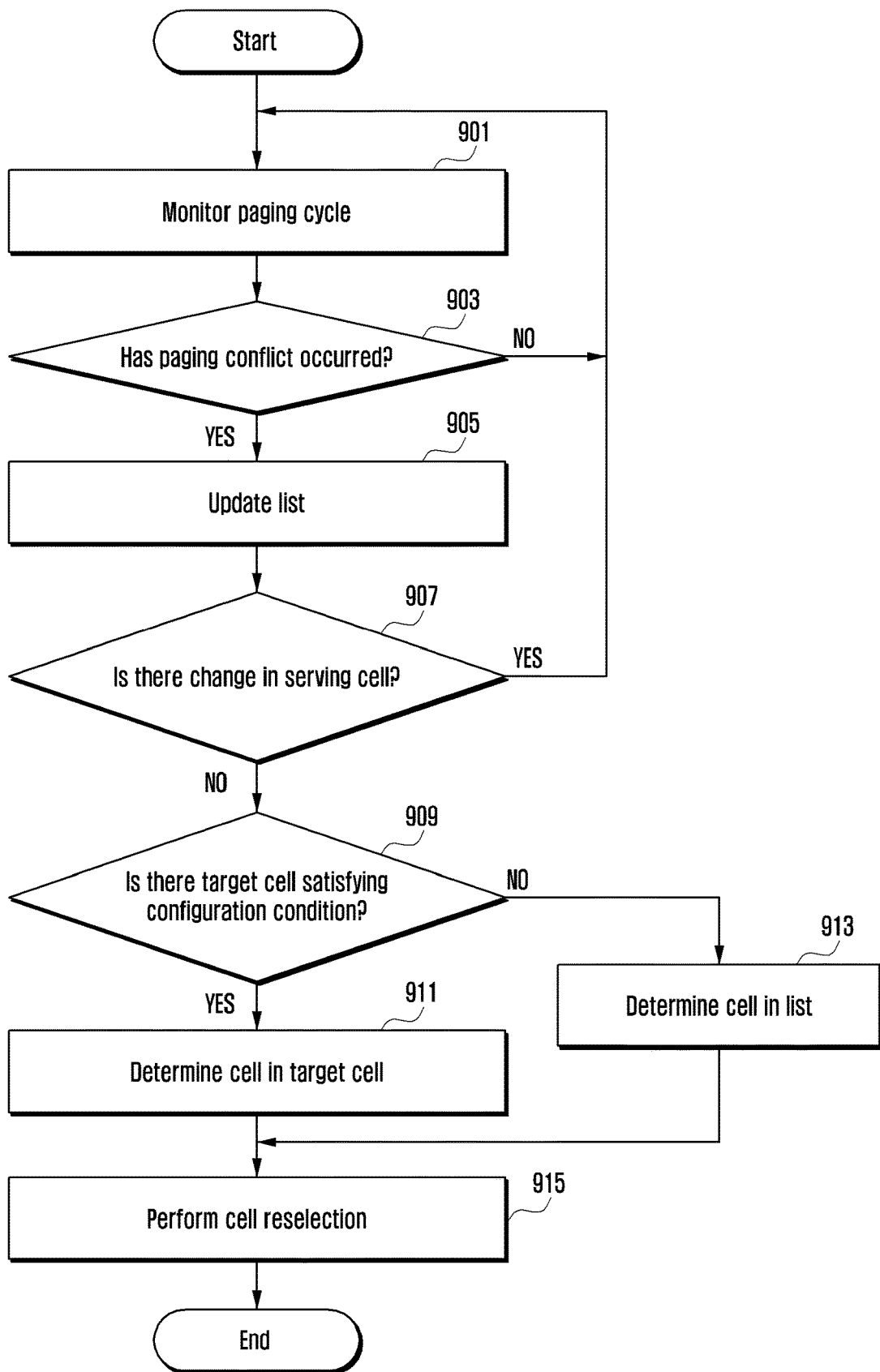
FIG. 9 is a flowchart illustrating a method of providing a communication service of an electronic device using a plurality of subscriber identification modules according to various embodiments.

FIG. 9 is a flowchart illustrating a method of providing a communication service of an electronic device 201 using a plurality of subscriber identification modules according to various embodiments.

Hereinafter, the operation of the electronic device 201 may be an operation performed (or processed) by the processor (e.g., the processor 120 of FIG. 1 or the processor 710 of FIG. 7) (hereinafter referred to as a "processor 710") of the electronic device 201.

Referring to FIG. 9, in operation 901, the processor 710 of the electronic device 201 may monitor a paging cycle. According to an embodiment, the processor 710 may identify a first paging cycle associated with the first SIM 740 and a second paging cycle associated with the second SIM 750. In various embodiments, in monitoring of a paging cycle (e.g., a monitoring trigger), for example, the electronic device 201 may move to enter a new cell (e.g., changing the serving cell of the first SIM 740 or the second SIM 750), or respond to receiving a paging message from at least one of the first SIM 740 or the second SIM 333. According to an embodiment, the first SIM 740 and the second SIM 750 are camped-on each serving cell, and both the first SIM 740 and the second SIM 750 operate in an idle mode without data transmission/reception, or any one of the first SIM 740 and the second SIM 750 may be in an active state in which data is transmitted and received.

In operation 903, the processor 710 may determine whether a paging collision occurs, based at least on the monitoring result of the paging cycle. According to an embodiment, the processor 710 may determine whether a paging collision occurs in which at least some sections of the first paging cycle associated with the first SIM 740 and the second paging cycle associated with the second SIM 750 overlap. For example, the processor 710 may determine whether a time point when the first SIM 740 wakes up according to the first paging cycle to identify whether there is a paging attempt, and a time point when the second SIM 750 wakes up according to the second paging cycle to identify whether there is a paging attempt overlap, and determine whether a paging collision occurs, based on the result.

In operation 903, if it is determined that there is no paging collision (NO in operation 903), the processor 710 may proceed to operation 901 to perform operations after operation 901.

In operation 903, if the processor 903 determines a paging collision (YES in operation 903), in operation 905, the processor 903 may update the list of subscriber identification modules. According to an embodiment, the processor 710 may add a serving cell (e.g., cell ID) corresponding to the idle second SIM 750 to the list. For example, the processor 710 may manage the cell ID of the serving cell of the second SIM 750 as a list, in which a paging collision with the serving cell of the first SIM 740 occurs, associated (or mapped) with the cell ID of the serving cell of the first SIM 740. In various embodiments, description will be given with reference to FIGS. 10 and 11 described below in connection with list management.

In operation 907, the processor 710 may determine whether there is a change in the serving cell. According to an embodiment of the disclosure, when a paging collision occurs, the processor 710 may determine whether the serving cell is changed in at least one of the first SIM 740 or the second SIM 750 for a configured time (e.g., a predetermined time) from the time the paging collision occurs.

In operation 907, when at least one serving cell of the first SIM 740 or the second SIM 750 is changed for a predetermined time (YES in operation 907), the processor 710 may proceed to operation 901, and may perform operations subsequent to operation 901.

In operation 907, if neither of the serving cells of the first SIM 740 and the second SIM 750 has been changed for a period of time (NO in operation 907), in operation 907, the processor 710 may determine in operation 909 whether there is a target cell that satisfies the configuration condition. According to an embodiment of the disclosure, the processor 710 may determine (or measure) signal strength of at least one neighboring cell associated with the idle second SIM 750, and determine whether there is a target cell (e.g., candidate cell for serving cell) among the neighboring cells that satisfies a reference level for which signal strength (or signal quality, etc.) is configured. In various embodiments, the reference level may include a signal measurement value for normally exchanging messages between the electronic device 201 and a cell. According to an embodiment, when cell reselection is performed with a weak electric field cell when cell reselection, the paging reception rate may decrease. Accordingly, according to various embodiments, the electric field condition may be configured as a target cell condition by considering at least a value higher than the value specified in the standard specification.

In operation 909, the processor 710 may determine a serving cell among the target cells in operation 911 when a target cell exists among neighboring cells (YES in operation 909). According to an embodiment, the processor 710 may determine a cell having a high priority (e.g., the strongest received signal strength) among target cells as a serving cell. According to an embodiment, when there is only one target cell, operation 911 might not be performed, and the processor 710 may determine the corresponding cell as a serving cell and immediately perform a cell reselection operation.

In operation 909, when a target cell does not exist among neighboring cells (NO in operation 909), in operation 913, a serving cell may be determined from among cells in the list. According to an embodiment of the disclosure, if the cell corresponding to the target cell condition is not searched among the neighboring cells, the processor 710 may determine a cell having a high priority (e.g., the strongest received signal strength) as a serving cell by referring to a list that is being managed (e.g., a list of cells related to the second SIM 750 of the idle state).

The processor 710 may perform a cell reselection operation in operation 915 in response to determining the serving cell in operation 911 or operation 913. According to an embodiment, the processor 710 may perform cell reselection for the second SIM 750 in an idle state.

Figure 10A:
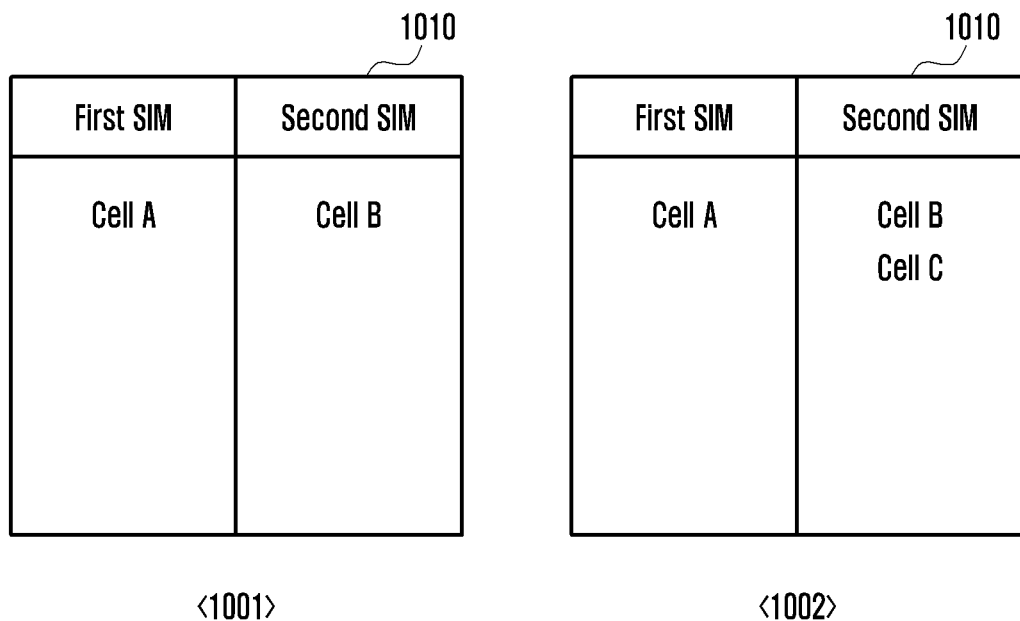
FIG. 10A is a diagram illustrating a list managed in an electronic device according to various embodiments and an example of using the list.
Figure 10B:
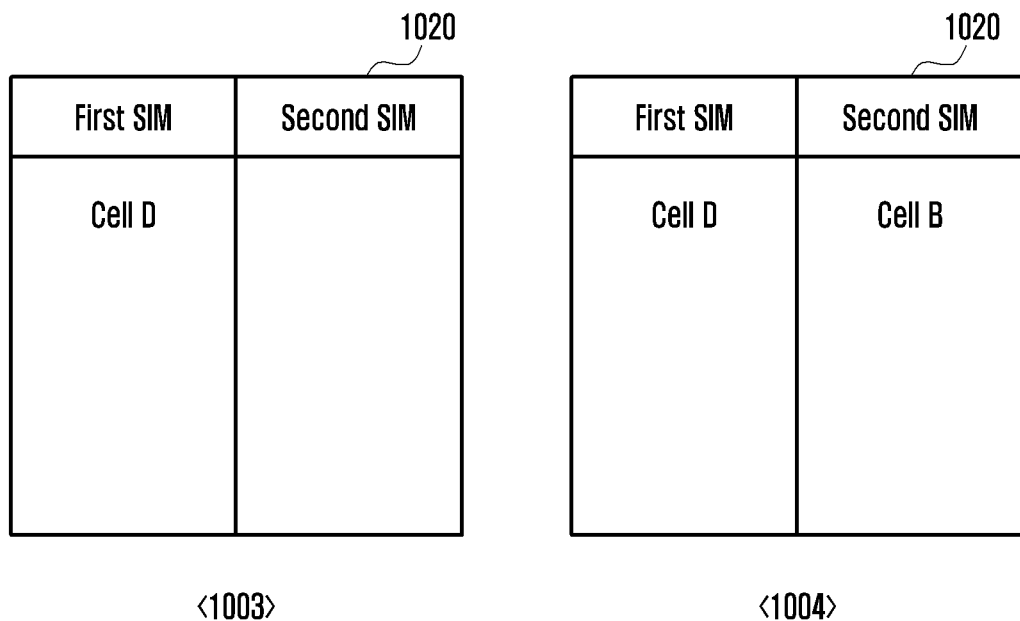
FIG. 10B is a diagram illustrating a list managed in an electronic device according to various embodiments and an example of using the list.
Figure 10C:
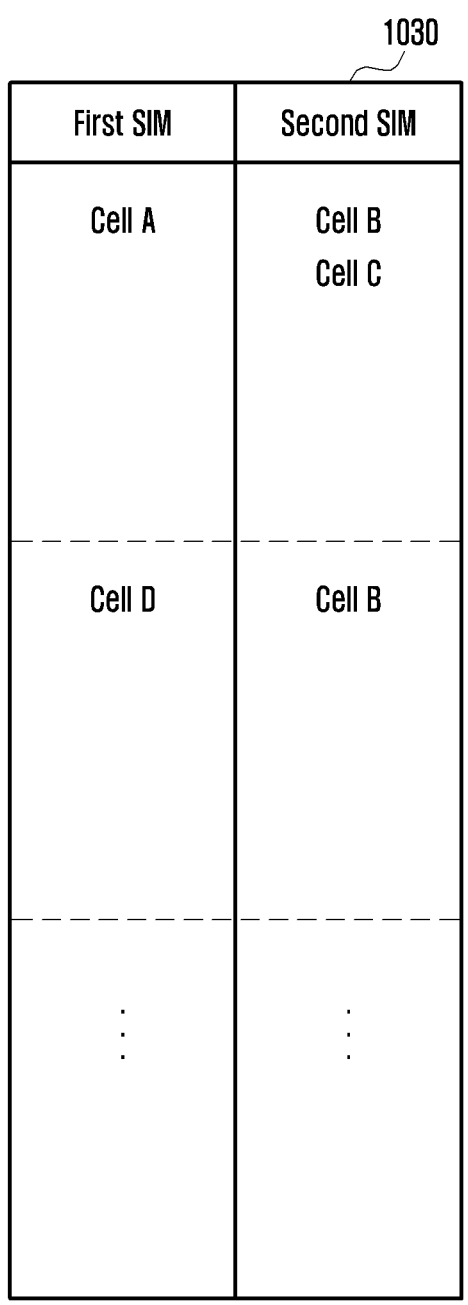
FIG. 10C is a diagram illustrating a list managed in an electronic device according to various embodiments and an example of using the list.

FIGS. 10A, FIG. 10B, and FIG. 10C are diagrams illustrating a list managed in an electronic device 201 according to various embodiments and an example of using the list.

Referring to reference number 1001 of FIG. 10A, for Cell A of the first SIM 740, Cell B of the second SIM 750 may represent a state registered as a cell in which a paging collision occurs. In various embodiments, for each serving cell of the first SIM 740 capable of data service, a serving cell corresponding to the second SIM 750 in an idle state may be managed as a list. According to an embodiment, the electronic device 201 may include the cell ID of the serving cell of the first SIM 740 among the serving cells previously camped on by the second SIM 750 and the cell ID of the serving cell in which a paging collision has occurred in the list 1010, in association with (or mapping to) the serving cell of the first SIM 740. Through this, when the first SIM 740 capable of data service is camped on the serving cell (e.g., Cell A), when the cell reselection of the second SIM 750 is performed, the electronic device 201 may prevent the second SIM 750 from camping on the Cell B. For example, the electronic device 201 may exclude Cell B from the target cell in the cell reselection operation of the second SIM 750.

The reference number 1002 of FIG. 10A may represent an example of list updating of a case in which a cell C corresponding to a new cell entry of the electronic device 201 or cell selection/reselection of the second SIM 750 in an idle state has a paging collision with Cell A where the first SIM 740 is camped on. According to an embodiment, the electronic device 201 may add the cell ID of Cell C to the list 1010 as a cell that causes a paging collision to Cell A of the first SIM 740.

Reference numeral 1003 and reference numeral 1004 of FIG. 10B may represent a list related to Cell D of the first SIM 740 when the serving cell of the first SIM 740 of the electronic device 201 is changed to Cell D. Reference number 1003 may represent a list 1020 of a state in which no paging collision has occurred between Cell D of the first SIM 740 and the serving cell of the second SIM 750. Reference numeral 1004 may represent an example of list updating when a cell B corresponding to cell selection/reselection of the second SIM 750 in the new cell entering or idle state of the electronic device 201 collides with the cell D in which the first SIM 740 is camped on. According to an embodiment, the electronic device 201 may add the cell ID of Cell B to the list 1020 as a cell that causes a paging collision to Cell D of the first SIM 740.

As shown in FIGS. 10A and 10B, according to various embodiments, the electronic device 201 may manage each list of SIMs (e.g., the second SIM 750 in an idle state) for which data service is not possible, for each cell of a SIM capable of data service (e.g., the first SIM 740). According to an embodiment, the electronic device 201 may include a first list in which cells of the second SIM 750 in which a paging collision occurs with a first serving cell of the first SIM 740 are mapped, and a second list in which the cells of the second SIM 750 in which a paging collision occurs with the second serving cell of the second SIM 740 are mapped. For example, the electronic device 201 may configure the cell-specific list of the first SIM 740 as an array.

According to an embodiment, the electronic device 201 may configure a cell-specific list of the first SIM 740 based on one list. An example of this is shown in list 1030 in FIG. 10C. Referring to FIG. 10C, the electronic device 201 may configure a list 1030 to which cells corresponding to the second SIM 750 are respectively mapped, for each cell (e.g., Cell A, Cell D) corresponding to the first SIM 740, thereby managing a list of paging collisions. According to various embodiments, the list (e.g., the list 1010, the list 1020, or the list 1030) managed by the electronic device 201 may be stored in the memory of the electronic device 201 (e.g., the memory 130 of FIG. 1).

An operation method of an electronic device using a plurality of subscriber identification modules, the method may include: monitoring paging cycles for a first subscriber identification module and a second subscriber identification module; determining whether a paging conflict has occurred in which a first paging cycle of the first subscriber identification module and a second paging cycle of the second subscriber identification module overlap for at least a certain interval; and performing cell reselection in response to a subscriber identification module of an idle state among the first subscriber identification module or the second subscriber identification module, based on whether the paging collision has occurred.

According to various embodiments, the first subscriber identification module may be in a radio resource control (RRC) connection state, and the second subscriber identification module may be in an RRC idle state, and the idle state may include a state without data transmission/reception, based on the subscriber identification module.

According to various embodiments, the operation method may further include receiving system information (SI) from a base station corresponding to the subscriber identification module.

According to various embodiments, the monitoring may include identifying paging cycles corresponding to the first subscriber identification module and the second subscriber identification module, based on the system information.

According to various embodiments, the performing reselecting may include determining any one subscriber identification module to perform cell reselection, it is determined that the paging collision has occurred.

According to various embodiments, the performing reselecting may include determining whether the serving cell is changed in at least one of the first subscriber identification module and the second subscriber identification module for a certain interval, when the processor determines that the paging collision has occurred.

According to various embodiments, the performing reselecting may include performing cell reselection for the second subscriber identification module in an idle state, based on no change in the serving cell of the first subscriber identification module and the serving cell of the second subscriber identification module for the certain interval.

According to various embodiments, the performing reselecting may include mapping the serving cell of the first subscriber identification module and the serving cell of the second subscriber identification module to manage as a list, when the processor determines that the paging conflict has occurred.

According to various embodiments, the performing reselecting may include determining a target cell that satisfies a configuration condition in the neighboring cells corresponding to the second subscriber identification module, and determining a serving cell for cell reselection of the second subscriber identification module, based on the target cell.

According to various embodiments, the performing reselecting may include determining the serving cell for cell reselection of the second subscriber identification module by referring to the list, when the target cell satisfying the configuration condition does not exist.

Various embodiments of the disclosure described and shown in the specification and the drawings have been presented to easily explain the technical contents of the embodiments of the disclosure and help understanding of the embodiments of the disclosure, and are not intended to limit the scope of the disclosure. Therefore, the scope of the disclosure should be construed to include, in addition to the embodiments disclosed herein, all changes and modifications derived on the basis of the technical idea of the disclosure.

The invention claimed is:

1. An electronic device comprising:
a first subscriber identification module (SIM);
a second SIM;
a communication circuitry operatively connected to the first SIM and the second SIM, wherein the first SIM is in a radio resource control (RRC) connection state, and the second SIM is in a RRC idle state, and the RRC idle state is configured to include a state without data transmission/reception, based on a SIM; and a processor operatively connected to the communication circuitry,
wherein processor is configured to:
monitor paging cycles for the first SIM and the SIM,
determine whether a paging conflict has occurred in which a first paging cycle of the first SIM and a second paging cycle of the second SIM overlap for at least a certain interval,
determine whether a serving cell is changed in at least one of the first SIM and the second SIM for a certain interval, when the processor determines that the paging conflict has occurred, and
perform cell reselection for the second SIM in a RRC idle state, based on determining that the serving cell is not changed in the first SIM and the second SIM for the certain interval.

2. The electronic device of claim 1, wherein the processor is further configured to receive system information (SI) broadcast from a base station camped on the basis of the first SIM or the second SIM, using the communication circuitry.

3. The electronic device of claim 2, wherein the processor is further configured to identify the paging cycles corresponding to the first SIM and the second SIM, based at least on the SI.

4. The electronic device of claim 1, wherein the processor is further configured to determine any one SIM to perform cell reselection, when the processor determines that the paging conflict has occurred.

5. The electronic device of claim 1, wherein the processor is further configured to map a serving cell of the first SIM and a serving cell of the second SIM to manage as a list, when the processor determines that the paging conflict has occurred.

6. The electronic device of claim 5, wherein the processor is further configured to:
determine a signal strength of at least one neighboring cell associated with the second SIM,
determine a target cell that satisfies a configuration condition among the at least one neighboring cell corresponding to the second SIM, and
determine a serving cell for cell reselection of the second SIM, based on the target cell.

7. The electronic device of claim 6, wherein the processor is further configured to determine a serving cell for cell reselection of the second SIM by referring to the list, when the target cell satisfying the configuration condition does not exist.

8. A method of providing a communication service of an electronic device using a plurality of subscriber identification modules, the method comprising:
monitoring paging cycles for a first subscriber identification module (SIM) and a second SIM, wherein the first SIM is in a radio resource control (RRC) connection state, and the second SIM is in a RRC idle state, and the RRC idle state is configured to include a state without data transmission/reception, based on a SIM,
determining whether a paging conflict has occurred in which a first paging cycle of the first SIM and a second paging cycle of the second SIM overlap for at least a certain interval,
determining whether a serving cell is changed in at least one of the first SIM and the second SIM for a certain interval, when a processor determines that the paging conflict has occurred, and
performing cell reselection the second SIM in a RRC idle state, based on determining that the serving cell is not changed in the first SIM and the second SIM for the certain interval.

9. The method of claim 8, wherein the monitoring comprises:
receiving system information (SI) broadcast from a base station camped on the basis of the first SIM or the second SIM; and
identifying paging cycles corresponding to the first SIM and the second SIM, based on the SI.

10. The method of claim 8, wherein the performing of the cell reselection comprises:
determining any one SIM to perform cell reselection, when the processor determines that the paging conflict has occurred.

11. The method of claim 8, wherein the performing of the cell reselection comprises:
mapping a serving cell of the first SIM and a serving cell of the second SIM to manage as a list, when the processor determines that the paging conflict has occurred,
determining a signal strength of at least one neighboring cell associated with the second SIM,
determining a target cell that satisfies a configuration condition in the neighboring cells corresponding to the second SIM,
determining a serving cell for cell reselection of the second SIM, based on the target cell, and
determining the serving cell for cell reselection of the second SIM by referring to the list of the target cell satisfying the configuration condition does not exist.

* * * * *